United States Patent
Czachor, Jr. et al.

(10) Patent No.: US 10,165,120 B2
(45) Date of Patent: Dec. 25, 2018

(54) SYSTEM AND METHOD FOR ESCALATING A CALL WITH A CLIENT

(71) Applicant: ASD Inc., a PA Corp., Media, PA (US)

(72) Inventors: Martin Czachor, Jr., Newtown Square, PA (US); Kevin Czachor, West Chester, PA (US); Norman Franke, Garnet Valley, PA (US); Gary Foster, Media, PA (US)

(73) Assignee: ASD INC., A PA CORP., Media, PA (US)

( * ) Notice: Subject to any disclaimer, the term of this patent is extended or adjusted under 35 U.S.C. 154(b) by 457 days.

(21) Appl. No.: 14/853,342

(22) Filed: Sep. 14, 2015

(65) Prior Publication Data

US 2017/0078485 A1    Mar. 16, 2017

(51) Int. Cl.
*H04M 3/51*     (2006.01)
*H04M 3/58*     (2006.01)
*H04M 3/523*    (2006.01)

(52) U.S. Cl.
CPC ....... *H04M 3/5175* (2013.01); *H04M 3/5233* (2013.01); *H04M 3/58* (2013.01)

(58) Field of Classification Search
CPC ..... H04M 3/5175; H04M 3/5233; H04M 3/58
USPC .......................... 379/212.01, 265.01, 265.14
See application file for complete search history.

(56) References Cited

U.S. PATENT DOCUMENTS

| | | | |
|---|---|---|---|
| 4,629,831 A | | 12/1986 | Curtin |
| 5,008,930 A | * | 4/1991 | Gawrys ............... H04M 3/5183 379/142.01 |
| 5,479,487 A | * | 12/1995 | Hammond ............. H04M 3/51 379/266.07 |
| 5,546,442 A | | 8/1996 | Foladare |
| 5,943,397 A | | 8/1999 | Gabin |
| 5,960,064 A | | 9/1999 | Foladare |
| 6,798,868 B1 | | 9/2004 | Montgomery |
| 7,573,982 B2 | | 8/2009 | Breen |
| 8,295,448 B2 | | 10/2012 | Hyerle |
| 8,467,515 B2 | | 6/2013 | Czachor, Jr. |
| 8,498,399 B2 | | 7/2013 | Czachor, Jr. |
| 2004/0018833 A1 | | 1/2004 | Praestgaard |
| 2007/0286389 A1 | | 12/2007 | Hyerle |
| 2012/0033800 A1 | * | 2/2012 | Czachor, Jr. ............ H04M 3/51 379/214.01 |
| 2014/0254775 A1 | * | 9/2014 | O'Connor ........... H04M 3/5175 379/68 |

(Continued)

*Primary Examiner* — Harry S Hong
(74) *Attorney, Agent, or Firm* — Steven H. Meyer, Esq.

(57) ABSTRACT

To respond to a call from a client to an organization, the call is directed to a lower-level agent associated with the organization for answering thereby. The lower-level agent employs a computing system of the organization, where the computing system includes an actuation device for initiating contact with a higher-level agent of the organization if it is determined that the calling client is calling regarding a matter worthy of escalation from the lower-level agent to the higher-level agent. A selection from the lower-level agent is received during the call of the actuation device to escalate the call from the lower-level agent to the higher-level agent, and in response to the received selection of the actuation device the call is escalated from the lower-level agent to the higher level agent.

20 Claims, 4 Drawing Sheets

(56) References Cited

U.S. PATENT DOCUMENTS

2014/0270135 A1* 9/2014 Odinak ............... H04M 3/5175
379/265.03
2015/0319307 A1* 11/2015 Govindarajan ....... H04M 3/523
379/265.02

* cited by examiner

SYSTEM AND METHOD FOR ESCALATING A CALL WITH A CLIENT

CROSS-REFERENCE TO RELATED APPLICATION

The present application relates at least generally to subject matter disclosed in U.S. Pat. Nos. 8,467,515 and 8,498,399, each of which is hereby incorporated by reference in its entirety.

FIELD

The present disclosure relates to a business organization or the like that interacts with clients on a regular basis, such as for example an answering service for professionals, a financial services firm, a utility services firm, an insurance services firm, and the like. More particularly, the present disclosure relates to such a business organization that regularly interacts with the clients over a medium such as a telephone communications system, and that in doing so can decide to escalate the level of interaction with the client such that a higher-level person associated with the business organization takes over from a lower-level person associated with the business organization, in a time-sensitive manner. Accordingly, a client or the like calling the organization can receive heightened service, such as for example better service, more attentive service, more specialized service, or the like, upon the lower-level person determining that the heightened service for the client is warranted.

BACKGROUND

In many business- or professional-related situations or the like, an age-old and recurring problem is effectuating the proper level of service that an organization provides for a client in a timely and efficient manner so that the needs of the client are met and also so that the organization maximizes the amount of business transacted with the client, among other things. For one example, if the organization is a bank and the client initiated a telephone call with a service representative of the bank, the bank would prefer that a more routine matter, such as an account balance inquiry, be handled by a lower-level service representative that is trained to handle such a routine matter, and also that is likely a less expensive resource of the bank. Correspondingly, the bank would prefer that a more complicated matter or a more profitable matter, such as an inquiry for a loan, be handled by a higher-level service representative that is trained to handle such a more complicated matter, and also that is likely trained to effectuate the loan.

For another example, if the organization is an insurer and a service representative of the insurer initiated a telephone call with the client, the insurer would prefer that a lower-level representative be employed to initially offer the client a service, such as an upgrade to an insurance policy, where the lower-level service representative is trained to handle such an initial offer, and again is likely a less expensive resource of the insurer. Correspondingly, the insurer would prefer that, in the event the client is receptive to the offer, a higher-level representative be employed to subsequently consult with the client, where the higher-level service representative is trained to handle the details of the upgrade, and also is trained to increase the likelihood that the offer is finally accepted.

For yet another example, if the organization is an answering service answering a telephone or other communications call to a professional, the answering service would prefer that a call-answering agent be employed to initially answer a call from a client to the professional on behalf thereof. Here, the agent may be trained to make an initial assessment of the nature of the call from the client and a determination of whether such agent is capable of satisfying the client by providing information thereto. If so, such as for example may be the case if the client is requesting an address of the professional, the lower-level representative need not contact the professional regarding the call and instead can handle the call without further ado. Accordingly, the professional need not be bothered for relatively mundane matters and instead the agent can handle same. If not, such as for example may be the case if the client is requesting a service from the professional, the agent may decide to contact the professional regarding the call and allow the professional to handle the call. Since the agent is to handle the relatively mundane matters on behalf of the professional, the professional can accordingly devote his or her time and expertise to handle relatively complicated matters, which likely are also matters that are more profitable to the professional, and/or are matters that require any especial expertise possessed by the professional.

In general, then, for an organization and/or an agency thereof in contact with a client by way of a communications call, a need exists for a system and method that allows a lower-level representative to handle the call with the client if such call relates to a more routine or mundane matter, and that also allows the lower-level representative to determine whether to escalate the call if such call relates to a more complicated or elaborate matter by involving a higher-level representative. Specifically, a need exists for such a system and method that guides the lower-level representative through the call with the client and in doing so helps the lower-level representative determine whether to escalate the call to the higher-level representative, More particularly, a need exists for such a system and method that effectuates the escalation of the call to the higher-level representative in a manner that is transparent to the client. With such a system and method, the lower-level representative, who is likely a less costly resource of the organization, can handle matters that do not require the higher-level representative, who is likely a more costly resource of the organization, thus resulting in greater efficiency with regard to use of resources of the organization.

SUMMARY

The aforementioned needs are satisfied by a system and method that responds to a call from a client to an organization. The call is directed to a lower-level agent associated with the organization for answering thereby. The lower-level agent employs a computing system of the organization, where the computing system includes an actuation device for initiating contact with a higher-level agent of the organization if it is determined that the calling client is calling regarding a matter worthy of escalation from the lower-level agent to the higher-level agent. A selection from the lower-level agent is received during the call of the actuation device to escalate the call from the lower-level agent to the higher-level agent, and in response to the received selection of the actuation device the call is escalated from the lower-level agent to the higher level agent.

BRIEF DESCRIPTION OF THE DRAWINGS

The foregoing summary as well as the following detailed description of various embodiments of the present innovation will be better understood when read in conjunction with the appended drawings. For the purpose of illustrating the various embodiments of the innovation, there are shown in the drawings embodiments that are presently preferred. As should be understood, however, the innovation is not limited to the precise arrangements and instrumentalities shown. In the drawings.

DETAILED DESCRIPTION OF PREFERRED EMBODIMENTS

Figure 1:
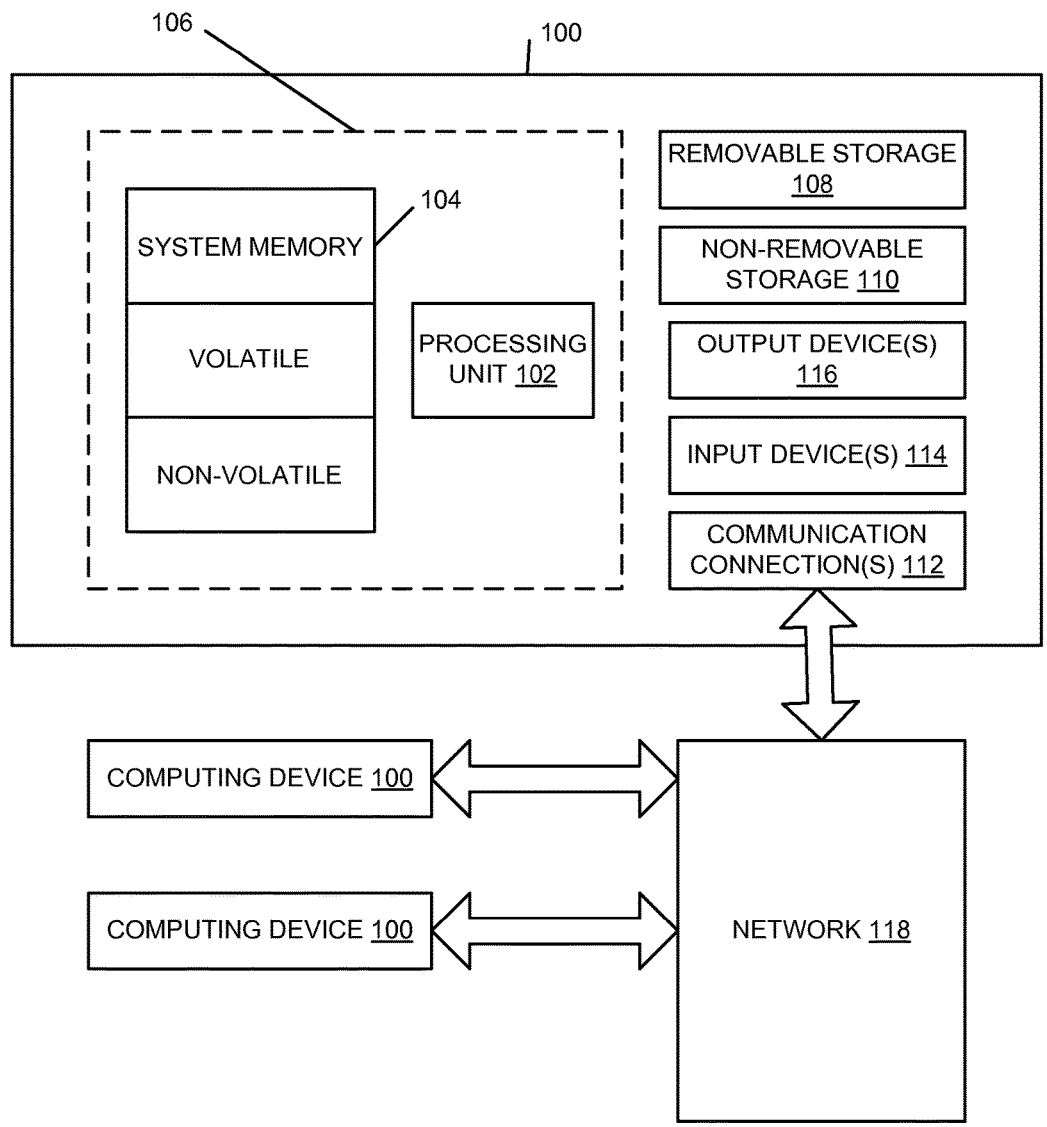
FIG. 1 is a block diagram of an example of a computing environment within which various embodiments of the present innovation may be implemented.

Certain terminology may be used in the following description for convenience only and is not limiting. The words "lower" and "upper" and "top" and "bottom" designate directions in the drawings to which reference is made. The terminology includes the words above specifically mentioned, derivatives thereof and words of similar import.

Where a term is provided in the singular, the inventors also contemplate aspects of the invention described by the plural of that term. As used in this specification and in the appended claims, the singular forms "a", "an" and "the" include plural references unless the context clearly dictates otherwise, e.g., "a tip" includes a plurality of tips. Thus, for example, a reference to "a method" includes one or more methods, and/or steps of the type described herein and/or which will become apparent to those persons skilled in the art upon reading this disclosure.

Unless defined otherwise, all technical and scientific terms used herein have the same meaning as commonly understood by one of ordinary skill in the art to which this invention belongs. Although any methods and materials similar or equivalent to those described herein can be used in the practice or testing of the present invention, the preferred methods, constructs and materials are now described. All publications mentioned herein are incorporated herein by reference in their entirety. Where there are discrepancies in terms and definitions used in references that are incorporated by reference, the terms used in this application shall have the definitions given herein.

Example Computing Environment

FIG. 1 is set forth herein as an exemplary computing environment in which various embodiments of the present invention may be implemented. The computing system environment is only one example of a suitable computing environment and is not intended to suggest any limitation as to the scope of use or functionality. Numerous other general purpose or special purpose computing system environments or configurations may be used. Examples of well-known computing systems, environments, and/or configurations that may be suitable for use include, but are not limited to, personal computers (PCs), server computers, handheld or laptop devices including smart phones and personal data assistants or the like, multi-processor systems, microprocessor-based systems, network PCs, minicomputers, mainframe computers, embedded systems, distributed computing environments that include any of the above systems or devices, and the like.

Computer-executable instructions such as program modules executed by a computer may be used. Generally, program modules include routines, programs, objects, components, data structures, etc. that perform particular tasks or implement particular abstract data types. Distributed computing environments may be used where tasks are performed by remote processing devices that are linked through a communications network or other data transmission medium. In a distributed computing environment, program modules and other data may be located in both local and remote computer storage media including memory storage devices.

With reference to FIG. 1, an exemplary system for implementing aspects described herein includes a computing device, such as computing device 100. In its most basic configuration, computing device 100 typically includes at least one processing unit 102 and memory 104. Depending on the exact configuration and type of computing device, memory 104 may be volatile (such as random access memory (RAM)), non-volatile (such as read-only memory (ROM), flash memory, etc.), or some combination of the two. This most basic configuration is illustrated in FIG. 1 by dashed line 106. Computing device 100 may have additional features and functionality. For example, computing device 100 may include additional storage (removable and/or non-removable) including, but not limited to, magnetic or optical disks or tape. Such additional storage is illustrated in FIG. 1 by removable storage 108 and non-removable storage 110.

Computing device 100 typically includes or is provided with a variety of computer-readable hardware media. Computer-readable media can be any available media that can be accessed by computing device 100 and includes both volatile and non-volatile media, removable and non-removable media. By way of example, and not limitation, computer-readable media may comprise computer storage media and communication media.

Computer storage media includes volatile and non-volatile, removable and non-removable media implemented in any method or technology for storage of information such as computer-readable instructions, data structures, program modules or other data. Memory 104, removable storage 108, and non-removable storage 110 are all examples of computer storage media. Computer storage media includes, but is not limited to, RAM, ROM, electrically erasable programmable read-only memory (EEPROM), flash memory or other memory technology, CD-ROM, digital versatile disks (DVD) or other optical storage, magnetic cassettes, magnetic tape, magnetic disk storage or other magnetic storage devices, or any other computer-readable hardware medium which can be used to store the desired information and which can accessed by computing device 100. Any such computer storage media may be part of computing device 100.

Computing device 100 may also contain communications connection(s) 112 that allow the device to communicate with other devices 100. Each such communications connection 112 is an example of communication media. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection (including VoIP), and wireless media such as acoustic, radio frequency (RF), infrared and other wireless media. The term computer-readable media as used herein includes both storage media and communication media.

Computing device 100 may also have input device(s) 114 such as keyboard, mouse, pen, voice input device, touch input device, etc. Output device(s) 116 such as a display, speakers, printer, etc. may also be included. All these devices are generally known to the relevant public and therefore need not be discussed in any detail herein except as provided.

Notably, computing device 100 may be one of a plurality of computing devices 100 inter-connected by a network 118, as is shown in FIG. 1. As may be appreciated, the network 118 may be any appropriate network, each computing device 100 may be connected thereto by way of a connection 112 in any appropriate manner, and each computing device 100 may communicate with one or more of the other computing devices 100 in the network 118 in any appropriate manner. For example, the network 118 may be a wired or wireless network within an organization or home or the like, and may include a direct or indirect coupling to an external network such as the Internet or the like. Likewise, the network 118 may be such an external network.

Particularly in the case where the network 118 is an external network, such network 118 may be a digitally based network (including VoIP) for exchanging computer data among the devices 100, may be an audio and/or video network for exchanging audio and/or video data among the devices 100, or the like. Thus, it may be that the network 118 may be a public switched telephone network for landline telephone communications, a mobile switching center for wireless telephone communications, a paging network for distributing paging information, a private multimedia network for establishing videoconferencing, or the like. Thus, it should be appreciated, that one or more of the computing devices 100 that are shown to the left of the network 118 in FIG. 1 may be a mobile telephone, a landline telephone, a pager, a mobile electronic mail device, a desktop electronic mail device, a mobile electronic texting device, a desktop electronic texting device, or a combination thereof, or the like.

It should be understood that the various techniques described herein may be implemented in connection with hardware or software or, where appropriate, with a combination of both. Thus, the methods and apparatus of the presently disclosed subject matter, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computer, the machine becomes an apparatus for practicing the presently disclosed subject matter.

In the case of program code execution on programmable computers, the computing device generally includes a processor, a storage medium readable by the processor (including volatile and non-volatile memory and/or storage elements), at least one input device, and at least one output device. One or more programs may implement or utilize the processes described in connection with the presently disclosed subject matter, e.g., through the use of an application-program interface (API), reusable controls, or the like. Such programs may be implemented in a high-level procedural or object-oriented programming language to communicate with a computer system. However, the program(s) can be implemented in assembly or machine language, if desired. In any case, the language may be a compiled or interpreted language, and combined with hardware implementations.

Although exemplary embodiments may refer to utilizing aspects of the presently disclosed subject matter in the context of one or more stand-alone computer systems, the subject matter is not so limited, but rather may be implemented in connection with any computing environment, such as a network 118 or a distributed computing environment. Still further, aspects of the presently disclosed subject matter may be implemented in or across a plurality of processing chips or devices, and storage may similarly be effected across a plurality of devices in a network 118. Such devices might include personal computers, network servers, and handheld devices, for example.

Effectuating Varying Levels of Service

As was alluded to above, in many businesses, organizations, and the like where service is provided to customers or clients, efficiency and good practice suggest that care should be taken when providing the service to the client so that the level of service matches the needs and/or requirements of the client and the relationship of the business with the client, among other things. Accordingly, if a client calls a bank for a relatively less significant matter, such as for example to check an account balance, it may be reasonable that a bank teller or a customer service representative handle the matter, and not the head of the bank. Likewise, if the client calls the bank for a relatively more significant matter, such as for example to obtain a business loan, it is reasonable that a loan officer or perhaps even the head of the bank handle the matter, and not the bank teller or customer service representative. More generally, effectuating the proper level of service that an organization provides for a client should be performed in a timely and efficient manner so that the needs of the client are met and also so that the organization maximizes the relationship with the client, among other things.

Depending on the organization, levels of service may be defined according to levels of agents, levels of professionals, levels of expertise, levels of experience, or any other differentiation without departing from the spirit and scope of the present innovation. For example, in a bank or the like, and as was set forth above, there may be a lower level of service to answer general inquiries from clients and a higher level of service to answer specific inquiries. Likewise, in a professional setting such as a law office, there may be a lower level of service to answer non-legal questions, and a higher level of service to answer legal questions.

In the context of an answering service or the like as was set forth above, a call-answering agent would be employed as a lower level of service to initially answer a call from a client to the professional on behalf thereof. The agent may be trained to make an initial assessment of the nature of the call from the client and a determination of whether such agent is capable of satisfying the client by providing information thereto. If so, the lower-level agent at the answering service can in fact provide the information and satisfy the client. If not, the lower-level agent can contact the higher-level professional regarding the call so that the higher-level professional can address same. Thus, and again, the higher-level professional need not be bothered for relatively mundane matters and instead the lower-level agent can handle same. As a result, the higher-level professional can devote more of his or her time and expertise to handle relatively complicated matters.

Professional Answering Service

Figure 2:
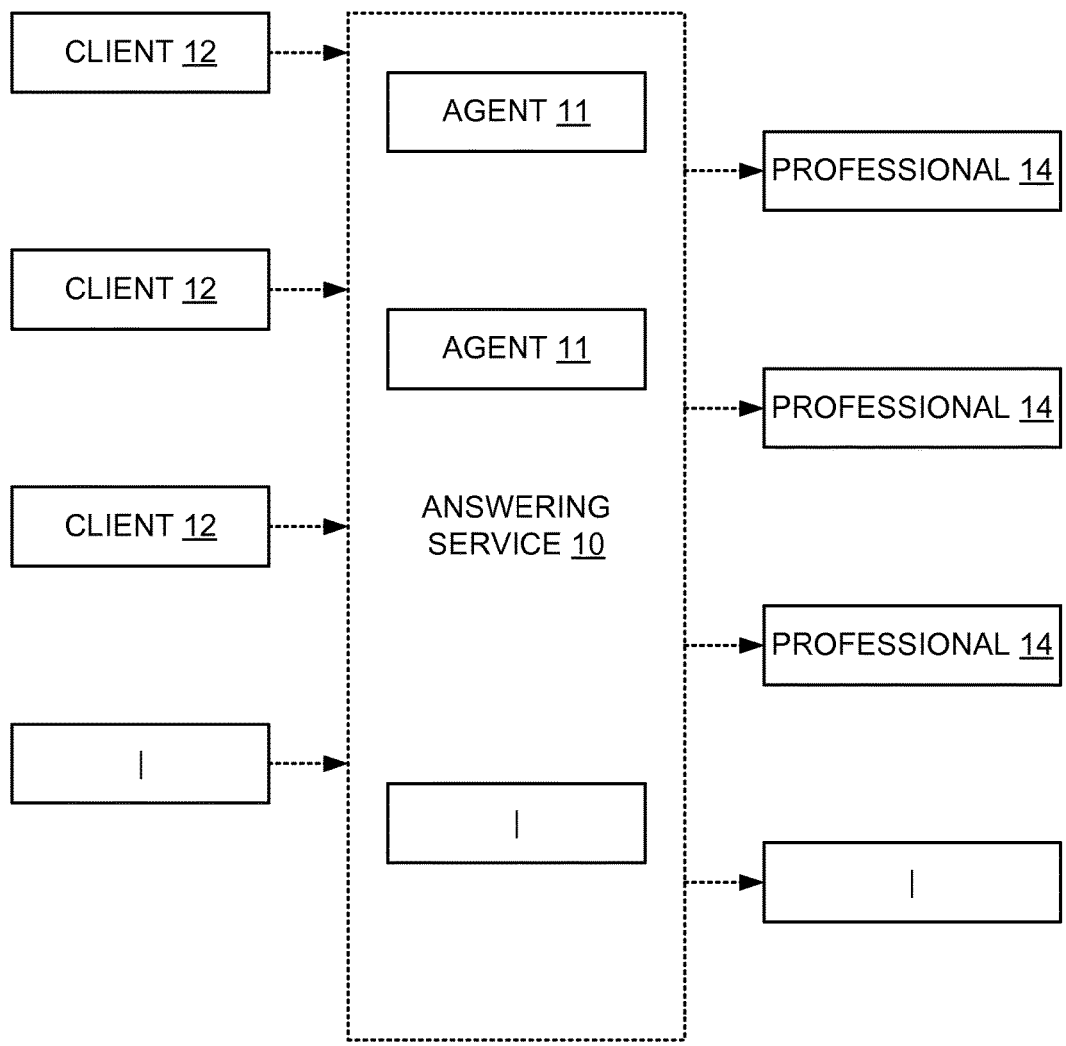
FIG. 2 is a block diagram showing a professional answering service provided to answer calls or the like from clients to professionals or the like in the event that the professionals are not willing or able to answer the calls.

Turning now to FIG. 2, it is seen that the aforementioned professional answering service 10 is provided with one or more lower-level agents 11 to answer each of one or more calls or the like from each of one or more clients 12 or the like to each of one or more higher-level professionals 14 or the like in the event that a particular professional 14 is not willing or able to answer a particular call from a particular client 12. Typically, although not necessarily, the answering service 10 is operated by a business organization that provides answering services or the like on behalf of multiple professionals 14. As was alluded to above, each client 12 and each professional 14 may be any appropriate respective client and professional without departing from the spirit and scope of the present innovation. Thus it may be that a particular professional 14 is a doctor, a lawyer, a service professional, a funeral director, or the like, among other things, and a particular client 12 calling to the professional 14 may require the professional services thereof, perhaps on an urgent basis.

The reason why the professional 14 does not answer a particular call may be most any reason without departing from the spirit and scope of the present innovation. For example, the professional 14 simply may not want to answer calls, such as for example if on a vacation or at a family event, among other things, or the professional 14 may be otherwise occupied by professional matters.

Presumptively, the call to the professional 14 from the client 12 is of a telephonic nature, at least for purposes of disclosing the present innovation in the present disclosure. Thus, it may be that the client 12 is employing a landline telephone or a mobile telephone (a device 100 of FIG. 1, e.g.), and is calling to a landline telephone or mobile telephone of the professional 14 (also a device 100 of FIG. 1, e.g.). Notably, though, the call to the professional 14 from the client 12 could be of some other nature without departing from the spirit and scope of the present innovation. For example, it may be that the client 12 is employing a digital electronic mail device or a digital texting device (again, a device 100 of FIG. 1, e.g.), and is addressing a digital electronic mail device or a digital texting device (once again, a device 100 of FIG. 1, e.g.) of the professional 14.

Particularly in the case where the call is telephonic in nature, the call from the client 12 to the professional 14 is forwarded therefrom to the answering service 10 by appropriate means that have already been established in a generally known manner. Typically, and as was alluded to above, upon the professional 14 engaging the answering service 10 to answer calls on behalf of such professional 14, the answering service 10 communicates with one or more telephone service providers or the like to effectuate such forwarding. As should be understood, the forwarding is typically controlled by the professional 14, an employer thereof, or the like, and may be performed according to any appropriate basis, including the time of day, whether forwarding has been positively engaged or disengaged, whether a particular call has been selected for forwarding, whether a call has rung a predetermined number of times, whether a phone or phone system of the professional 14 is off, or the like. In any case, the call from the client 12 to the professional 14 is in fact answered by a lower-level agent 11 or the like at the answering service 10 on behalf of the higher-level professional 14.

Funeral Professional

The professional 14 of the present innovation may be most any professional. As but one example, it may be that the professional 14 offers funeral-related services, such as a funeral director, a funeral home, a cremation service, a cemetery, a casket and coffin company, a livery service, an embalmer, a funeral transport service, a coroners, a monument company, a grief counselor, a body and tissue donation service, a burial service, and the like. Notably, such funeral professionals 14 share a common need for a heightened level of dignity, caring, and compassion in connection with the services provided thereby to a client 12, as well as the services provided on their behalf to the client 12 by the answering service 10.

For example, a funeral director attending to a first client 12 is expected to devote an especially heightened level of care and compassion to such first client 12, even when a second client 12 is calling such funeral director. Nevertheless, the second client 12 also should expect the same heightened level of care and compassion. Thus, the dilemma is whether to interrupt the first client 12 to answer the second client 12, or to ignore the second client 12, either of which may be considered to be particularly insensitive if not rude. Moreover, the dilemma may be compounded in the case where the second client 12 is an initial caller initially calling regarding obtaining funeral services for a deceased, and ignoring same would result in the second client 12 obtaining funeral services elsewhere, thus representing a substantial monetary loss to the funeral professional 14.

In such an instance, the lower-level agent 11 at the answering service 10 in answering the call from the initially calling second client 12 on behalf of the higher-level funeral professional 14 allows same to at least somewhat satisfy the needs of the second client 12 for the moment, and helps to prevent the second client 12 from obtaining funeral services elsewhere. More generally, the lower-level agent 11 at the answering service 10 can determine from a client 12 the nature of the call therefrom, and based thereon can decide whether to escalate the call by transferring same from the lower-level agent 11 to the higher-level funeral professional 14 or otherwise involving the higher-level funeral professional 14, or at least by inviting the higher-level professional 14 to join into the call. For example, if the client 12 is calling to request the name of a local florist, the lower-level agent 11 may be able to handle the request without bothering the higher-level funeral professional 14, and therefore may decide to not escalate the call. In contrast, if the client 12 is calling to initiate a funeral, the lower-level agent 11 may decide it is worthwhile to involve the higher-level funeral professional 14, and therefore may decide to escalate the call.

Escalating System

Figure 3:
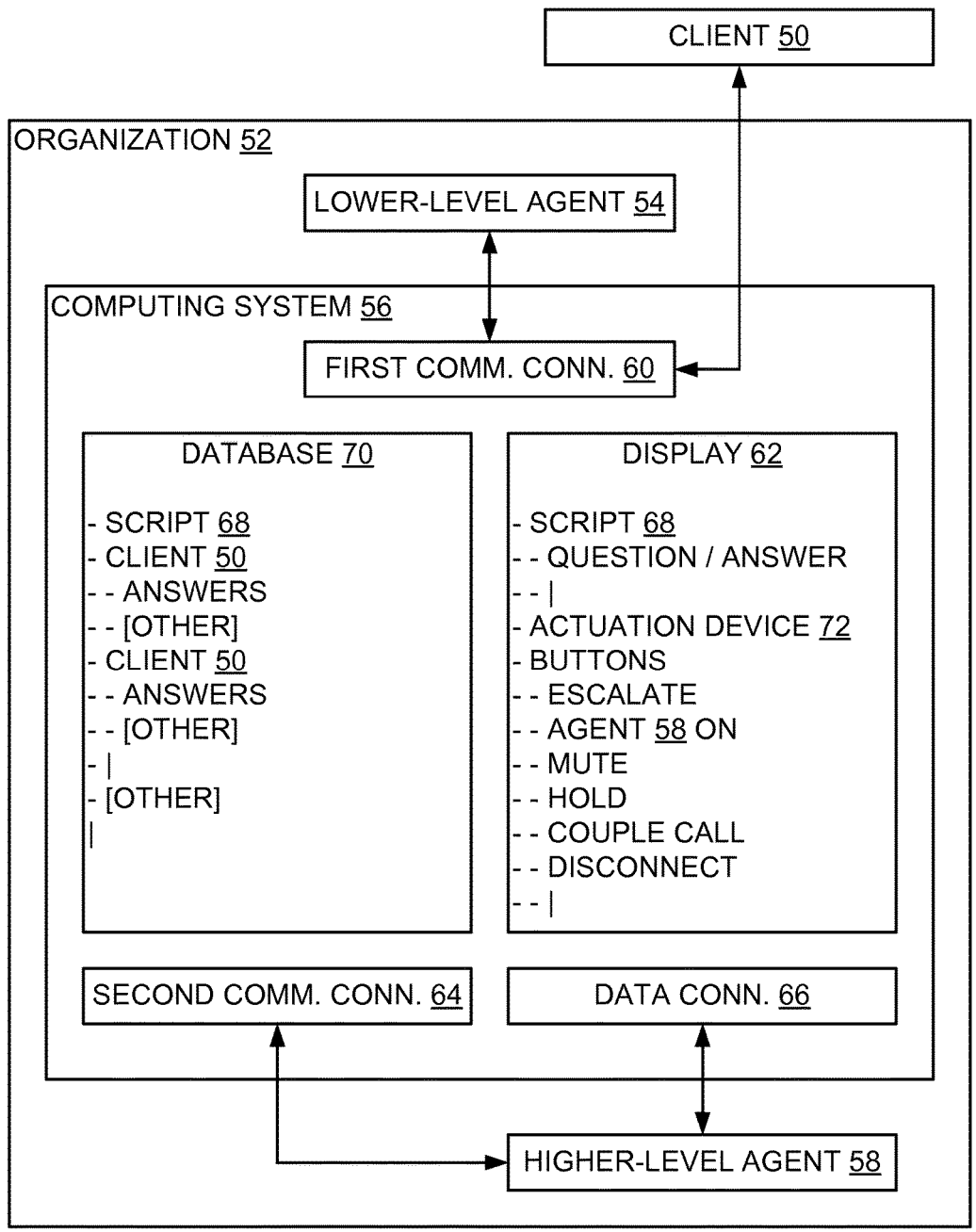
FIG. 3 is a block diagram of a computing system employed to answer a call from a client such as that of FIG. 2 to an organization in accordance with various embodiments of the present innovation.

Whether the organization providing the levels of service is a funeral-related organization or otherwise, and turning now to FIG. 3, it is seen that in various embodiments of the present innovation, a call from a client 50 to an organization 52, whether answered by the organization 52 or by a service on behalf of the organization 52, is in fact initially answered by a lower-level agent 54 associated with the organization 52, either directly or indirectly. Thus, the lower-level agent 52 may be a bank teller, an agent at the answering service 10 of FIG. 2, a customer service representative, a receptionist, or any other lower-level entity associated with the organization 52, all without departing from the spirit and scope of the present innovation.

In various embodiments, and as seen in FIG. 3, the lower-level agent 52 employs or otherwise uses a computing system 56 instantiated by or on behalf of the organization 52. Notably, such a computing system 56 as instantiated includes a mechanism for initiating contact with a higher-level agent 58 of the organization 52 as soon as the lower-level agent 54 thereof who is answering the call determines that the calling client 12 is calling regarding a higher-level matter worthy of escalation. Here, the higher-level agent 58 may be a professional such as a lawyer or doctor, a funeral professional, any higher-level functionary as compared with the lower-level agent 54, or any other higher-level entity associated with the organization 52, all without departing from the spirit and scope of the present innovation. Notably, the terms 'lower-level' and 'upper level' as applied the agents 54, 58 are intended to represent only relative perceived status within the organization 52, and are not intended in any pejorative or derogatory sense.

As seen in FIG. 3, the computing system 56 is in the nature of the computing device 100 on the top part of FIG. 1. It may be appreciated that the computing system 56 may among other things include a first communications connection 60 or the like for effectuating the call with the client 50, a display 62 or the like upon which is shown various items, a second communications connection 64 or the like for outgoing calls and automated voicemail dispatch or the like, and a data connection 66 or the like for outgoing data messages or the like, perhaps in the nature of electronic mail or a text message as will be set forth in more detail below.

Figure 4:
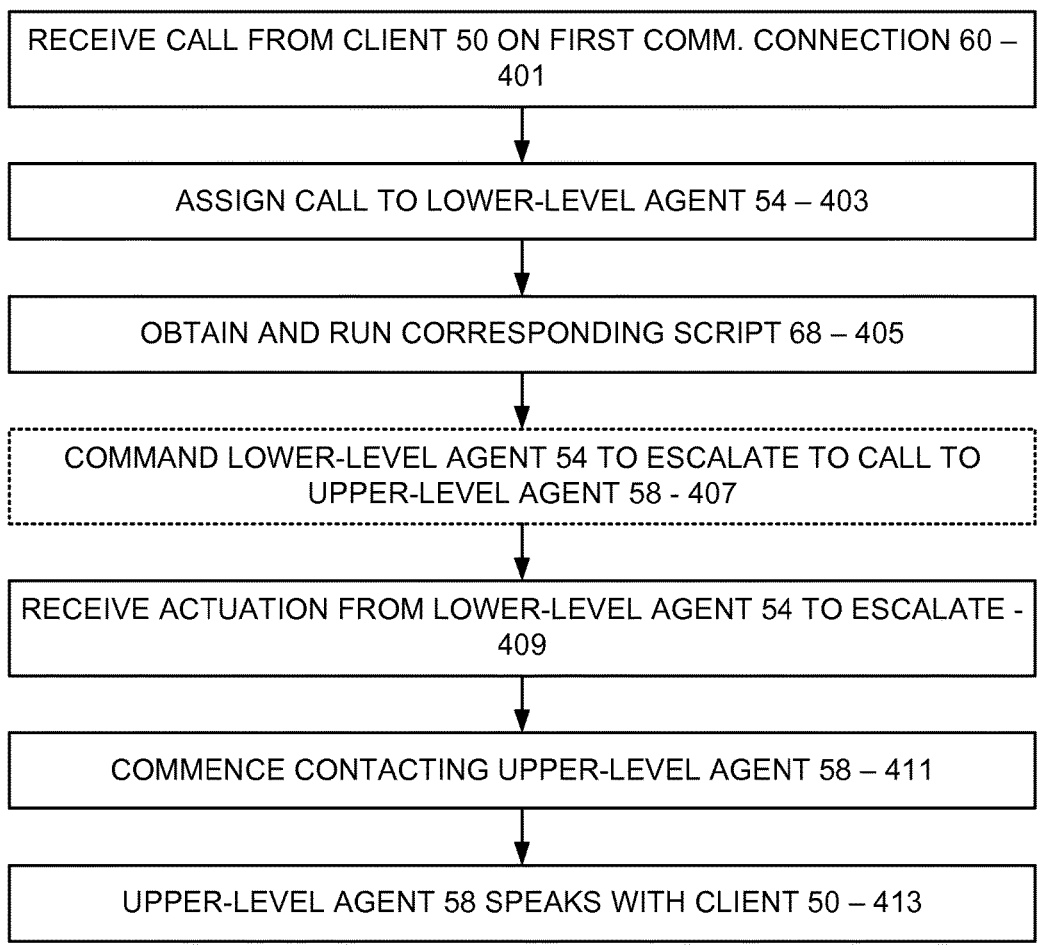
FIG. 4 is a diagram showing actions performed by the computing system of FIG. 3 in accordance with various embodiments of the present innovation.

The lower-level agent 54 at the computing system 56 of the organization 52 may answer a particular call from a client 50 according to a predetermined procedure or 'script' 68 that has been established for the lower-level agent 54. Accordingly, and now referring also to FIG. 4, as an initial matter the particular call is received on the first communications connection 60 of the computing system 56 (401, FIG. 4), and is assigned by the system 56 to the lower-level agent 54 (403). Note here that assigning the call to the lower-level agent 54 may be performed on any appropriate basis without departing from the spirit and scope of the present innovation. For example, all incoming calls for the organization 52 may be initially routed to lower-level agents 54 on a random or non-random basis, or the client 50 may have navigated an automated decision tree to route the call to the lower-level agent 54, among other things.

At any rate, based on assigning the call to the lower-level agent 54 as at 403, the system 56 obtains and runs a corresponding script 68 for the agent 54 to employ (405), perhaps from a local or remote database 70 (FIG. 3). As may be appreciated, the system 56 may identify the script 68 for the lower-level agent 54 in any appropriate manner, such as for example based on the agent 54, based on the client 50, based on the aforementioned automated decision tree, or the like. Such identifying is known or should be apparent to the relevant public and therefore need not be set forth herein in any detail other than that which is provided.

As may be understood, the obtained and run script 68 as at 405 is in an electronic form, and may have any appropriate structure. Typically, although not necessarily, the script 68 includes a number of questions that are displayed on the display 62 of the computing system 56, the lower-level agent 54 asks the questions to the calling client 50 and enters corresponding answers into appropriate pre-defined spaces in the display 62, and the entered answers can be stored in a record of appropriate form in the database 70 or elsewhere. As should be understood, the questions and answers relate at least partially to ascertaining the purpose of the call from the calling client 50 if not servicing the needs of the client at least as much as the lower-level agent 54 is capable of doing so.

The questions may be displayed and the answers collected individually or in groups, and the script 68 may include branching points where different answers to a previous question result in different next questions, among other things. As may be appreciated, the script 68 can be quite extensive so as to accommodate a wide range of subjects, including the general nature of the call from the client 50, the name, location, and telephone number of the calling client 50, a pre-determined status of the calling client 50, whether the calling client 50 has recently called before, or the like. Note here that at least some of such information can possibly be collected automatically. For example, the name, location, and telephone number of the calling client 50 may be obtained from known sources such as caller ID or other similar information. In such a circumstance, it may be that the corresponding question is automatically skipped, or that the information is confirmed by the agent.

In various embodiments of the present innovation, the script 68 contains various trigger points built thereinto, where each trigger point upon being reached directs the lower-level agent 54 to escalate the call to be further handled by a higher-level agent 58. As should be understood, each trigger point within the script 68 represents a determination that the call from the client 50 is of a sufficiently important nature or is otherwise worthy enough so that the client 50 deserves or otherwise requires the attention and time of the higher-level agent 58. Each trigger point may be of most any nature without departing from the spirit and scope of the present innovation. For example, the trigger point may be a determination that the client 50 requires a relatively valuable service from the organization 52, or that the organization 52 may suffer a loss if the client 50 does not receive special attention, among other things. As such, each trigger point may require that the lower-level agent 54 escalate the call to the attention of a particular higher-level agent 58, a particular type of higher-level agent 58, a particular level of higher-level agent 58, or the like.

Note that while a trigger point within the script 68 could automatically escalate the call to a higher-level agent 58 without notifying the lower-level agent 54 and/or the client 50, such an automatically escalated call may be considered jarring or otherwise confusing and unpleasant to the lower-level agent 54 and/or the client 50. Accordingly, it may be that a trigger point within the script 68 results in a command displayed to the lower-level agent 54 by the display 62 thereof that the call is to be escalated (407), after which the lower-level agent 54 can inform the client 50 regarding same. If so, it may be that the displayed command includes the name and/or other indicia of the higher-level agent 58 to which the call is to be escalated, and the lower-level agent 54 can inform the client 50 regarding this too. Thereafter, the lower-level agent 54 may actuate the escalation of the call in an appropriate manner, such as for example by entering an appropriate command or selecting an 'escalate' button or the like shown on the display 62 (409).

In various embodiments of the present innovation, the lower-level agent 54 during the course of the call with the client 50 may decide on his or her own and independently of any trigger point in the script 68 that the call should be escalated to a higher-level agent 58, and based thereon may actuate the escalation of the call in an appropriate manner as at 409, such as for example by entering an appropriate command or selecting an 'escalate' button or the like shown on the display 62. In any instance, it may be that the higher-level agent 58 to which the call is to be escalated is selected by the lower-level agent 54, is named by default in the script 68, is selected by the script 68 according to predetermined selection criteria, or is selected by the lower-level agent 54 from a list of higher-level agents 58 as shown in the display 62, among other things. Again, the lower-level agent 54 can inform the client 50 regarding the escalation of the call, and thereafter the lower-level agent 54 may enter an appropriate command to the computing system 56 to actuate the escalation of the call as at 409.

Although set forth thus far as an 'escalate' button, in various embodiments of the present innovation, and as seen in FIG. 3, the option to actuate contacting the higher-level agent 58 may be provided by way of any appropriate actuation device 72 on the display 62, including the 'escalate' button or the like. As should be understood, such actuation device 72 is actuated by the lower-level agent 54 as at 409 by way of a displayed cursor and associated mouse, by way of touching if the display 62 is a touch display, by way of a keystroke or keystroke sequence on an associated keyboard of the computing system 56, or the like. Alternately, the actuation device 72 may be separate from the display 62, and in particular may be hardware on an associated keyboard of the computing system 56 or some other related structure, and/or software actuated by such software. Also alternately, the escalation could be automatically invoked based on the answer to a scripted question, among other things.

Upon actuating escalation by way of an actuation device 72 such as an 'escalate' button or otherwise, the computing system 56 performs whatever functionality is necessary to in fact contact the higher-level agent 58, perhaps by way of the second communications connection 64 or data connection 66 (411). Thus, the computing system 56 initiates contact with the upper-level agent 58 immediately, or at least as soon as is practicable, while the call from the client 50 is still in progress. Such functionality is known or should be apparent from the present disclosure and therefore need not be set forth herein in any detail other than that which is provided. Generally, the higher-level agent 58 can be contacted by way of a predetermined mobile telephone line, landline telephone line, pager, mobile electronic mail device, desktop electronic mail device, mobile electronic texting device, desktop electronic texting device, or a combination thereof, or the like. Upon contacting the upper-level agent 58 or as part of contacting the upper-level agent 58, then, the lower-level agent 54 and/or the computing system 56 transmits thereto at least some of the corresponding record in the database 70 so that the upper-level agent 58 can be at least partially aware of the nature of the call from the client 50 thus far. Such transmitting may be performed orally if over a telephone line or the like, or electronically if by way of an electronic message or the like to an application on a smart phone, for example, or perhaps both.

In various embodiments of the present innovation, the computing system 56 automatically sends an electronic copy of the record of the call to the upper-level agent 58 and also contacts the upper-level agent 58 by way of a telephone call or the like. Thus, presuming that the upper-level agent 58 is at an appropriately configured work station, or even at an appropriately configured smart phone for example, or the like, the upper-level agent 58 can immediately review the call thus far and speak with the client 50 regarding same (413).

In other embodiments of the present innovation, the upper-level agent 58 need not necessarily speak with the client 50 immediately. Instead, the computing system 56 may give the upper-level agent 58 the option to decide whether to join in at all, or perhaps to merely monitor the call with the client 50 without joining. As such, the monitoring upper-level agent 58 would be joining into the call in a 'stealth' mode, able to hear the conversation but not speak or otherwise interrupt. Such an option to monitor in a stealth mode or otherwise may be implemented by way of a vocalized menu system or the like, as may be appreciated. As may be appreciated, despite the request to escalate, there are times when the upper-level agent 58 knows that immediate involvement is not needed and/or advisable and thus such request to escalate should be declined.

Presuming, however, that the upper-level agent 58 does in fact wish to speak to the client 50, and in various embodiments, the computing system 56 communicatively couples the upper-level agent 58 with the client 50 in a manner that is generally known, perhaps with a corresponding appropriate vocalized message to the upper-level agent 58. However, in doing so, the computing system 56 may initially place the upper-level agent 58 in a mute mode so that the upper-level agent 58 can hear the client 50 and the lower-level agent 54 but cannot be heard thereby. Thus, the upper-level agent 58 can listen to the call while in progress, and is not suddenly and perhaps jarringly present in such deceased call. In addition, the computing system 56 may notify the lower-level agent 54 that the upper-level agent 58 is listening, perhaps by way of an appropriate highlighted button or a message in the display 62 (FIG. 3). Thus, the lower-level agent 54 can then notify the calling client 50 that the upper-level agent 58 may be currently available to speak with such calling client 50.

It may be that the lower-level agent 54 thereafter removes the mute mode from the upper-level agent 58 to allow the calling client 14 and upper-level agent 58 to speak directly, again perhaps by way of appropriate highlighted buttons in the display 62 (FIG. 3). However, the lower-level agent 54 may wish to speak directly to the upper-level agent 58 without the client 50 hearing, perhaps to provide additional information. Thus, it may be that prior to removing the aforementioned mute mode, the lower-level agent 54 politely places the call with the client 50 on hold when appropriate, once more perhaps by way of an appropriate highlighted button in the display 62 (FIG. 3), then removes such mute mode from the upper-level agent 58, consults with the upper-level agent 58, then removes the hold on the call with the client 50, still once more perhaps by way of an appropriate highlighted button in the display 62 (FIG. 3), introduces the calling client 50 and the upper-level agent 58 to each other, and allows both to speak directly to each other. Alternately, rather than the lower-level 54 agent controlling entry of the upper-level agent 58 into conversation with the client 50, the upper-level 58 controls entry thereof into conversation with the client 50, perhaps by actuating a command or simply by speaking. If so, the actuated command may result in a request to the lower-level agent 54 for such entry, or may itself result in such entry without any action on the part of the lower-level agent 54.

Notably, by giving the gathered information thereof to the upper-level agent 58, the calling client 50 need not repeat same. Moreover, the upper-level agent 58 with such information can proceed to address the matter of the client 50 that much more quickly inasmuch as administrative details may have already been dealt with and communicated to the upper-level agent 58. Also notably, once the calling client 50 and the upper-level agent 58 are introduced to each other and speaking by way of the coupled call, the lower-level agent 54 need not necessarily be involved in the call, and therefore may disconnect out of the call, still once more again perhaps by way of an appropriate highlighted button in the display 62. Alternately, the lower-level agent 54 can stay in the coupled call to take notes on behalf of the upper-level agent 58, and can then deliver the notes to such upper-level agent 58, perhaps by way of an electronic mail or text message or the like.

As thus far set forth, the client 50 calls to the organization 52 and at least initially speaks with a lower-level agent 54 thereof before possibly being escalated to an upper-level agent 58 if it is perceived that the nature of the call from the client 50 warrants the attention of such upper-level agent 58. It should be understood, though, that the present innovation also encompasses the reverse situation where the lower-level agent 54 of the organization calls to the client 50 and at least initially speaks with same before possibly escalating the call to an upper-level agent 58 if it is perceived that the nature of the call to the client 50 warrants the attention of such upper-level agent 58. Such reverse situation may require appropriate modifications to the embodiments thus far set forth. Such modifications are believed to be minor, however, and at any rate should be apparent to the relevant public based on the present disclosure. Accordingly, such modifications need not be set forth herein in any detail other than that which is provided.

CONCLUSION

The programming believed necessary to effectuate the processes performed by the computing system 56 in connection with the various embodiments of the present innovation is relatively straight-forward and should be apparent to the relevant programming public. Accordingly, such programming is not attached hereto. Any particular programming, then, may be employed to effectuate the various embodiments of the present innovation without departing from the spirit and scope thereof.

In the present innovation, a method and mechanism are set forth for allowing a lower-level agent 54 of an organization 52 to handle a call with a client 50 if such call relates to a more routine or mundane matter, and also for allowing the lower-level agent 54 to determine whether to escalate the call to an upper-level agent 58 if such call relates to a more complicated or elaborate matter, or if the nature of the call otherwise requires such escalation. The computing system 56 and the script 68 guides the lower-level agent 54 through the call with the client 50 and in doing so helps the lower-level agent 54 determine whether to escalate the call to the higher-level agent 58, and/or automatically escalates same. The escalation of the call to the higher-level agent 58 occurs in a manner that is transparent to the client 50. Thus, the lower-level agent 54, who is likely a less costly resource of the organization 52, can handle matters that do not require the higher-level agent 58, who is likely a more costly resource of the organization 52, which results in greater efficiency with regard to use of resources of the organization 52.

It should be appreciated that changes could be made to the embodiments described above without departing from the innovative concepts thereof. For example, although the present innovation is set forth with specific reference to an answering service 10 and a funeral professional 14, such innovation may also be practiced by any other appropriate type of business where call escalation from a lower-level agent 54 to a higher-level agent 58 is deemed necessary and/or advisable. Moreover, although the present innovation is set forth primarily in terms of telephonic calls or the like, such innovation may also be practiced by in connection with any other appropriate type of communications medium and other types of callers, perhaps with suitable modification. Likewise, although the present innovation is set forth with reference to the use of a script 68, such script 68 need not necessarily be employed, in which case the call may be answered in a free-form manner, with suitable modification. It should be understood, therefore, that this innovation is not limited to the particular embodiments disclosed, but it is intended to cover modifications within the spirit and scope of the present innovation as defined by the appended claims.

The invention claimed is:

1. A method of responding to a call from a client to an organization, the method comprising:

directing the call to a lower-level agent associated with the organization for answering thereby, the lower-level agent employing a computing system of the organization, the computing system including a processor, a memory, an inputting device, and a display, the computing system further including an actuation device for initiating contact with a upper-level agent of the organization if it is determined that the calling client is calling regarding a matter worthy of escalation from the lower-level agent to the upper-level agent, the actuation device being instantiated in the memory of the computing system by the processor thereof and displayed to the lower-level agent at the display of the computing system;

receiving at the computing system by way of the inputting device thereof a selection from the lower-level agent, during the call, of the actuation device to escalate the call from the lower-level agent to the upper-level agent; and escalating by way of the computing system the call from the lower-level agent to the upper-level agent in response to the received selection of the actuation device, the escalating comprising the computing system communicatively coupling the upper-level agent with the calling client, the communicatively coupling including:

initially placing the upper-level agent in a mute mode so that the upper-level agent can hear the calling client and the lower-level agent but cannot be heard thereby;

notifying the lower-level agent that the upper-level agent is listening by way of the display of the computing system and allowing the lower-level agent to notify the calling client that the upper-level agent may be currently available to speak with the calling client;

receiving by way of the inputting device a selection from the lower-level agent to remove the mute mode from the upper-level agent to allow the calling client and upper-level agent to speak directly, and in response thereto removing the mute mode, the method further comprising, upon the computing system receiving the selection of the actuation device from the lower-level agent to escalate to call from the lower-level agent to the upper-level agent:

showing to the lower-level agent in the display a list of upper-level agents;

allowing the lower-level agent to select one of the upper-level agents in the shown list; and receiving from the lower-level agent the selected one of the upper-level agents in the shown list, the method comprising escalating the call from the lower-level agent to the selected one of the upper-level agents.

2. The method of claim 1 wherein the lower-level agent has a lesser perceived status within the organization as compared with the upper-level agent.

3. The method of claim 1 further comprising displaying to the lower-level agent answering the call from the client a predetermined script selected for at least one of the call, the client, and the lower-level agent.

4. The method of claim 1 further comprising displaying to the lower-level agent answering the call from the client a predetermined script selected for at least one of the call, the client, and the lower-level agent, the script for collecting and storing information regarding the call from the client according to a branching arrangement where different answers to a previous question branch to different next questions.

5. The method of claim 1 further comprising displaying to the lower-level agent answering the call from the client a predetermined script selected for at least one of the call, the client, and the lower-level agent, the script for ascertaining a purpose of the call from the client and servicing a need of the client at least as much as the lower-level agent is capable of doing so.

6. The method of claim 1 further comprising displaying to the lower-level agent answering the call from the client a predetermined script selected for at least one of the call, the client, and the lower-level agent, the script having therein at least one trigger point, each trigger point if encountered directing the agent to escalate the call to be further handled by a upper-level agent, the trigger point representing a determination that the call from the client requires the attention of the upper-level agent.

7. The method of claim 1 further comprising displaying to the lower-level agent answering the call from the client a predetermined script selected for at least one of the call, the client, and the lower-level agent, the script having therein at least one trigger point, each trigger point if encountered directing the agent to escalate the call to be further handled by a upper-level agent, the trigger point representing a determination that the call from the client requires the attention of the upper-level agent, the method further comprising encountering the trigger point and in response thereto displaying a command to the lower-level agent that the call should be escalated.

8. The method of claim 1 further comprising displaying to the lower-level agent answering the call from the client a predetermined script selected for at least one of the call, the client, and the lower-level agent, the script having therein at least one trigger point, each trigger point if encountered directing the agent to escalate the call to be further handled by a upper-level agent, the trigger point representing a determination that the call from the client requires the attention of the upper-level agent, the method further comprising encountering the trigger point and in response thereto displaying a command to the lower-level agent that the call should be escalated, the displayed command including indicia of the upper-level agent to which the call is to be escalated, where the lower-level agent can inform the client regarding same.

9. The method of claim 1 further comprising displaying to the lower-level agent answering the call from the client a predetermined script selected for at least one of the call, the client, and the lower-level agent, the script having therein at least one trigger point, each trigger point if encountered directing the agent to escalate the call to be further handled by a upper-level agent, the trigger point representing a determination that the call from the client requires the attention of the upper-level agent, the method comprising receiving the selection from the lower-level agent of the actuation device independently of any trigger point in the script.

10. The method of claim 1 wherein escalating the call comprises:

allowing the lower-level agent to inform the client regarding the escalation of the call;

contacting the upper-level agent while the call with the client is in progress;

transmitting to the upper-level agent information relating to the call with the client;

connecting the contacted upper-level agent with the client and allowing the connected upper-level agent to speak with the client; and allowing the lower-level agent to withdraw from the call after the upper-level agent has been connected to the client.

11. A method of initiating a call from an organization to a client, the method comprising:

directing the call to a lower-level agent associated with the organization for initially speaking with the client, the lower-level agent employing a computing system of the organization, the computing system including a processor, a memory, an inputting device, and a display, the computing system further including an actuation device for initiating contact with a upper-level agent of the organization if it is determined that the call to the client is worthy of escalation from the lower-level agent to the upper-level agent, the actuation device being instantiated in the memory of the computing system by the processor thereof and displayed to the lower-level agent at the display of the computing system;

receiving at the computing system by way of the inputting device thereof a selection from the lower-level agent, during the call, of the actuation device to escalate the call from the lower-level agent to the upper-level agent; and escalating by way of the computing system the call from the lower-level agent to the upper-level agent in response to the received selection of the actuation device, the escalating comprising the computing system communicatively coupling the upper-level agent with the client, the communicatively coupling including:

initially placing the upper-level agent in a mute mode so that the upper-level agent can hear the client and the lower-level agent but cannot be heard thereby;

notifying the lower-level agent that the upper-level agent is listening by way of the display of the computing system and allowing the lower-level agent to notify the client that the upper-level agent may be currently available to speak with the client;

receiving by way of the inputting device a selection from the lower-level agent to remove the mute mode from the upper-level agent to allow the client and upper-level agent to speak directly, and in response thereto removing the mute mode, the method further comprising, upon the computing system receiving the selection of the actuation device from the lower-level agent to escalate to call from the lower-level agent to the upper-level agent:

showing to the lower-level agent in the display a list of upper-level agents;

allowing the lower-level agent to select one of the upper-level agents in the shown list; and receiving from the lower-level agent the selected one of the upper-level agents in the shown list, the method comprising escalating the call from the lower-level agent to the selected one of the upper-level agents.

12. The method of claim 11 wherein the lower-level agent has a lesser perceived status within the organization as compared with the upper-level agent.

13. The method of claim 11 further comprising displaying to the lower-level agent speaking to the client a predetermined script selected for at least one of the call, the client, and the lower-level agent.

14. The method of claim 11 further comprising displaying to the lower-level agent speaking to the client a predetermined script selected for at least one of the call, the client, and the lower-level agent, the script for collecting and storing information regarding the call from the client according to a branching arrangement where different answers to a previous question branch to different next questions.

15. The method of claim 11 further comprising displaying to the lower-level agent speaking to the client a predetermined script selected for at least one of the call, the client, and the lower-level agent, the script for handling the call with the client at least as much as the lower-level agent is capable of doing so.

16. The method of claim 11 further comprising displaying to the lower-level agent speaking to the client a predetermined script selected for at least one of the call, the client, and the lower-level agent, the script having therein at least one trigger point, each trigger point if encountered directing the agent to escalate the call to be further handled by a upper-level agent, the trigger point representing a determination that the call with the client requires the attention of the upper-level agent.

17. The method of claim 11 further comprising displaying to the lower-level agent speaking to the client a predetermined script selected for at least one of the call, the client, and the lower-level agent, the script having therein at least one trigger point, each trigger point if encountered directing the agent to escalate the call to be further handled by a upper-level agent, the trigger point representing a determination that the call with the client requires the attention of the upper-level agent, the method further comprising encountering the trigger point and in response thereto displaying a command to the lower-level agent that the call should be escalated.

18. The method of claim 11 further comprising displaying to the lower-level agent speaking to the client a predetermined script selected for at least one of the call, the client, and the lower-level agent, the script having therein at least one trigger point, each trigger point if encountered directing the agent to escalate the call to be further handled by a upper-level agent, the trigger point representing a determination that the call with the client requires the attention of the upper-level agent, the method further comprising encountering the trigger point and in response thereto displaying a command to the lower-level agent that the call should be escalated, the displayed command including indicia of the upper-level agent to which the call is to be escalated, where the lower-level agent can inform the client regarding same.

19. The method of claim 11 further comprising displaying to the lower-level agent speaking to the client a predetermined script selected for at least one of the call, the client, and the lower-level agent, the script having therein at least one trigger point, each trigger point if encountered directing the agent to escalate the call to be further handled by a upper-level agent, the trigger point representing a determination that the call with the client requires the attention of the upper-level agent, the method comprising receiving the selection from the lower-level agent of the actuation device independently of any trigger point in the script.

20. The method of claim 11 wherein escalating the call comprises:
- allowing the lower-level agent to inform the client regarding the escalation of the call;
- contacting the upper-level agent while the call with the client is in progress;
- transmitting to the upper-level agent information relating to the call with the client;
- connecting the contacted upper-level agent with the client and allowing the connected upper-level agent to speak with the client; and
- allowing the lower-level agent to withdraw from the call after the upper-level agent has been connected to the client.

* * * * *